(12) United States Patent
Hartman et al.

(10) Patent No.: US 8,664,567 B2
(45) Date of Patent: Mar. 4, 2014

(54) METAL CORED WIRE

(75) Inventors: Dennis K. Hartman, Olmsted Township, OH (US); Vaidyanath B. Rajan, Mentor, OH (US)

(73) Assignee: Lincoln Global, Inc., City of Industry, CA (US)

( * ) Notice: Subject to any disclaimer, the term of this patent is extended or adjusted under 35 U.S.C. 154(b) by 2658 days.

(21) Appl. No.: 11/350,705

(22) Filed: Feb. 9, 2006

(65) Prior Publication Data

US 2007/0181549 A1 Aug. 9, 2007

(51) Int. Cl.
*B23K 9/09* (2006.01)

(52) U.S. Cl.
USPC ............. 219/130.51; 219/145.22; 219/146.31

(58) Field of Classification Search
USPC .......... 219/137 WM, 145.22, 146.23, 146.24, 219/146.31, 146.32, 146.41
See application file for complete search history.

(56) References Cited

U.S. PATENT DOCUMENTS

| | | | | |
|---|---|---|---|---|
| 5,192,851 | A * | 3/1993 | James et al. | 219/130.51 |
| 5,824,992 | A * | 10/1998 | Nagarajan et al. | 219/145.22 |
| 6,787,736 | B1 * | 9/2004 | Chen et al. | 219/146.31 |
| 2002/0153364 | A1 | 10/2002 | North | |
| 2003/0094444 | A1 | 5/2003 | Kato | |
| 2003/0178402 | A1 | 9/2003 | Nikodym | |
| 2004/0056012 | A1 | 3/2004 | Inui | |
| 2004/0232131 | A1 | 11/2004 | North | |
| 2004/0256370 | A1 | 12/2004 | Keegan | |
| 2006/0081579 | A1 | 4/2006 | Kotecki | |
| 2006/0096966 | A1 | 5/2006 | Munz | |
| 2006/0144836 | A1 | 7/2006 | Karogal | |
| 2006/0163231 | A1 | 7/2006 | Kobayashi | |
| 2006/0186103 | A1 | 8/2006 | Rajan | |
| 2006/0219685 | A1 | 10/2006 | Karogal | |

FOREIGN PATENT DOCUMENTS

| | | |
|---|---|---|
| EP | 0867520 | 9/1998 |
| EP | 1559498 | 8/2005 |
| EP | 1712327 | 10/2006 |
| JP | 58070992 | 4/1983 |
| JP | 9001344 | 1/1997 |
| JP | 9285891 | 11/1997 |

OTHER PUBLICATIONS

European Search Report and Annex to the European Search Report on EP Patent Application No. EP 06 01 5327.

* cited by examiner

*Primary Examiner* — Brian Jennison

(74) *Attorney, Agent, or Firm* — Hahn Loeser & Parks LLP

(57) ABSTRACT

A metal cored electrode used to form a weld metal on a workpiece having improved yield strength, tensile strength and impact toughness by the combination of molybdenum, titanium and boron, the electrode containing at least about 0.001 weight percent boron, at least about 0.05 weight percent molybdenum, at least about 0.005 weight percent titanium and a majority of iron, the above metal alloy system having an average yield strength of at least about 70 ksi and an average tensile strength of at least about 90 ksi.

30 Claims, No Drawings

METAL CORED WIRE

The invention relates generally to the field of welding, and more particularly directed to an electrode for forming a weld metal on a workpiece, and even more particularly directed to an electrode for forming a weld metal having increased yield and tensile strengths and good impact properties.

INCORPORATION BY REFERENCE

U.S. Pat. Nos. 5,118,919; 5,365,036; 5,824,992; and 6,787,736 are incorporated by reference to illustrated various types of electrodes that can be used to join pipe sections.

BACKGROUND OF THE INVENTION

Metal-core weld wires are generally composite tubular filler metal electrodes having a metal sheath and a core composition formed of various powdered materials. As compared to flux-cored wires, metal-core wires have a core composition comprising primarily of metallic and alloying powders with substantially reduced amounts of fluxing agents.

During the manufacture of metal-core wires, the core composition is commonly blended and deposited onto a steel strip, which is formed into a tube, or sheath, about the core composition in a forming mill. The steel sheath surrounding the core composition is then drawn through reducing dies to a specified diameter, and any lubricants accumulated onto the exterior of the wire can be removed in a baking process; however, this is not required.

Metal-core wires are used increasingly as an alternative to solid weld wires for improved productivity in structural fabrication. Metal-core wires can have increased weld deposition rates and produce wider, more consistent penetration profiles than solid wires. Metal-core wires can also generate less spatter, provide improved arc stability and produce weld deposits with an improved wetting characteristic in comparison to solid wires.

Metal core wires are increasing used in the welding of metal pipe. When welding larger metal pipe, it is becoming more common to form a weld bead in a narrower groove having a width of about 8-20 mm. The narrower groove allows for a single pass in each layer of weld metal. As such, faster welding times and smaller weld beads are achieved. However, when forming a weld bead in a narrow groove, the cooling rate of the weld bead is generally faster due to the lower heat input when forming the weld bead. These faster cooling rates of the weld metal can result in a weld bead having increased yield and tensile strengths, but reduced fracture toughness. As such, a weld bead having such reduced properties can result in it cracking and/or breaking from the metal pipe, thus severely compromising the integrity of the welded joint.

Prior art metal cored electrodes have been formulated to increase the impact strength properties of the weld metal. One such metal cored electrode is disclosed in U.S. Pat. No. 5,824,992, which is incorporated herein by reference.

Although advancements have been made in the prior art regarding metal cored electrodes, there remains a need in the art for a metal cored electrode that can form a weld with improved toughness at high yield and tensile strengths.

SUMMARY OF THE INVENTION

The present invention pertains to electrodes that form a weld metal on a workpiece, and more particularly to a metal cored electrode that forms a weld metal on a workpiece having increased yield and tensile strength characteristics. The present invention also pertains to the composition of a weld metal formed by an electrode which has increased yield and tensile strength characteristics. The weld metal and electrode used to form the weld metal is useful in welding pipe joints; however, the weld metal and electrode have much broader applications. The weld metal composition formed by the metal cored electrode of the present invention has a unique combination of molybdenum, titanium and boron. Generally, the weld metal formed from the metal cored electrode of the present invention includes at least about 0.04 weight percent molybdenum; at least about 0.0002 weight percent boron; at least about 0.001 weight percent titanium and a majority weight percent iron.

In one non-limiting aspect of the present invention, the molybdenum content of the weld metal generally does not exceed about 1.5 weight percent, and typically does not exceed about 0.75 weight percent. The boron content of the weld metal generally does not exceed about 0.015 weight percent, and typically does not exceed about 0.0075 weight percent. The titanium content of the weld metal generally does not exceed about 0.125 weight percent, and typically does not exceed about 0.06 weight percent.

In another and/or alternative non-limiting aspect of the present invention, other metals can be included in the weld metal. Such other metals include, but are not limited to, aluminum, carbon, chromium, copper, manganese, nickel and/or silicon. The aluminum content of the weld metal, when included in the weld metal, generally does not exceed about 0.1 weight percent, and typically does not exceed about 0.05 weight percent. The carbon content of the weld metal, generally does not exceed about 0.2 weight percent, and typically does not exceed about 0.15 weight percent. The copper content of the weld metal, when included in the weld metal, generally does not exceed about 0.2 weight percent, and typically does not exceed about 0.1 weight percent. The manganese content of the weld metal generally does not exceed about 5 weight percent, and typically does not exceed about 3.5 weight percent. The nickel content of the weld metal generally does not exceed about 5 weight percent, and typically does not exceed about 3.5 weight percent. The silicon content of the weld metal generally does not exceed about 3 weight percent, and typically does not exceed about 2 weight percent.

In one non-limiting example of the present invention, the weld metal formed by the metal cored electrode of the present invention includes, by weight percent:
B at least 0.001%
Mo at least 0.05%
Ti at least 0.005%
Fe at least 60%

In another non-limiting example, the weld metal formed by the metal cored electrode of the present invention includes, by weight percent:
B 0.001-0.02%
Mo 0.05-2%
Ti 0.005-0.5%
Fe at least 75%

In still another non-limiting example, the weld metal formed by the metal cored electrode of the present invention includes, by weight percent:
B 0.002-0.015%
Mo 0.1-1.5%
Ti 0.01-0.18%
Fe at least 80%

In still another non-limiting example, the weld metal formed by the metal cored electrode of the present invention includes, by weight percent:
B 0.0025-0.008%
C 0.01-0.1%
Mo 0.15-0.8%
Mn 0.1-3%
Ni 0-3%
Si 0-1%
Ti 0.015-0.1%
Fe at least 85%

In yet another non-limiting example, the weld metal formed by the metal cored electrode of the present invention includes, by weight percent:
Al 0-0.08%
B 0.003-0.0065%
C 0.015-0.1%
Cu 0-0.15%
Mo 0.2-0.5%
Mn 0.1-2.4%
Ni 0-2.5%
Si 0-0.8%
Ti 0.015-0.05%
Fe at least 92%

The Ti to B weight percent ratio in the weld metal is generally at least about 2:1, and typically about 3-15:1, and more typically about 4-10:1; however, other weight ratios can be used. The total weight percent of Ti and B in the weld metal is generally at least about 0.0012, and typically at least about 0.02. The total weight percent of Ti and B in the weld metal is generally less than about 0.6, and typically less than about 0.1. As can be appreciated, other total weight percentages of Ti and B in the weld metal can be used. The Mo to Ti weight percent ratio in the weld metal is generally at least about 4:1, typically about 7-24:1, and more typically about 8-18:1; however, other weight ratios can be used. The total weight percent of Ti and Mo in the weld metal is generally at least about 0.041, and typically at least about 0.2. The total weight percent of Ti and Mo in the weld metal is generally less than about 2.5, and typically less than about 1. As can be appreciated, other total weight percentages of Ti and Mo in the weld metal can be used. It has been found that by controlling the Ti to B weight percent ratio in the weld metal and/or the Mo to Ti weight percent ratio in the weld metal, the desired weld metal properties can be achieved.

The weld metal formed by the metal cored electrode of the present invention has improved notch toughness and yield strength. The average Charpy impact toughness of the weld metal is generally at least about 20 ft-lbs at −30° C. and at least about 25 ft-lbs at −20° C., typically at least about 22 ft-lbs at −30° C. and at least about 30 ft-lbs at −20° C., more typically at least about 30 ft-lbs at −30° C. and at least about 37 ft-lbs at −20° C., and even more typically about 30-65 ft-lbs at −30° C. and about 38-88 ft-lbs at −20° C.; however, it can be appreciated that weld metal having other Charpy impact toughness can be formed. The average yield strength of the weld metal is generally at least about 70 ksi, typically at least about 80 ksi, and more typically about 85-145 ksi; however, it can be appreciated that weld metal having other yield strengths can be formed. The average tensile strength of the weld metal is generally at least about 90 ksi, typically at least about 95 ksi, and more typically about 98-155 ksi; however, it can be appreciated that weld metal having other tensile strengths can be formed. The average percent elongation of the weld metal is generally less than about 30%, typically less than about 27%, and more typically about 10-26%; however, it can be appreciated that weld metal having other amounts of elongation can be formed. The physical properties of the weld metal of the present invention is particularly useful in forming weld bead in narrower grooves wherein the cooling rate of the weld metal is increased. The composition of the weld metal results in increased yield strengths, tensile strengths and notch toughness of the formed weld bead even at faster cooling rate.

The metal cored electrode that is used to form the weld metals as set forth above is typically a gas shielded electrode; however, this is not required. The shielding gas, when used, at least partially provides protection to the weld bead from elements and/or compounds in the atmosphere. The shielding gas generally includes one or more gases. These one or more gases are generally inert or substantially inert with respect to the composition of the weld bead. In one non-limiting example, argon, carbon dioxide, helium, or mixtures thereof are at least partially used as a shielding gas. As can be appreciated other or additional inert or substantially inert gases can be used.

The metal sheath that is used to form the metal cored electrode is generally formed primarily from an iron alloy (e.g., carbon steel, low carbon steel, stainless steel, low alloy steel, etc.). The fill composition generally constitutes at least about 1 weight percent of the total electrode weight, and not more than about 60 weight percent of the total electrode weight, and typically about 5-50 weight percent of the total electrode weight, and more typically about 12-30 weight percent of the total electrode weight, and even more typically about 13-25 weight percent of the total electrode weight; however, it can be appreciated that other weight percentages can be used. The fill composition includes a plurality of metal alloying agents to form the desired weld metal composition. Such metal alloying agents include, but are not limited to, aluminum, boron, carbon, chromium, copper, manganese, molybdenum, nickel, silicon and/or titanium.

In one non-limiting example, the composition of the metal cored electrode in weight percent is as follows:
B at least 0.001%
Mo at least 0.05%
Ti at least 0.005%
Fe at least 70%

In another one non-limiting example, the composition of the metal cored electrode in weight percent is as follows:
B 0.0015-0.025%
Mo 0.05-2.5%
Ti 0.005-0.6%
Fe at least 80%

In still another one non-limiting example, the composition of the metal cored electrode in weight percent is as follows:
B 0.002-0.02%
C 0.008-0.2%
Mo 0.1-1.7%
Mn 0.05-5%
Ni 0-5%
Si 0-3%
Ti 0.01-0.2%
Fe at least 85%

In yet another one non-limiting example, the composition of the metal cored electrode in weight percent is as follows:
Al 0-0.5%
B 0.0025-0.01%
C 0.01-0.15%
Cu 0-0.5%
Mo 0.2-1.5%
Mn 0.1-3
Ni 0-3%
Si 0-1.5%

Ti 0.015-0.1%
Fe at least 88%

As can be appreciated, the metal cored electrode can have other compositions.

In one non-limiting example, the metal powder in the fill composition based on total weight percent of the metal cored electrode is as follows:

B at least about 0.001%
Mo at least about 0.01%
Ti at least about 0.001

In another non-limiting example, the metal powder in the fill composition based on total weight percent of the metal cored electrode is as follows:

Al 0-0.5%
B 0.001-0.025%
Fe 0-75%
Mo 0-2.5%
Mn 0-5
Ni 0-5%
Si 0-3%
Ti 0.001-0.6%

As can be appreciated, the metal powder in the fill composition can have other compositions. The fill composition of the metal cored electrode includes little, if any, flux agents (e.g., metal oxides, metal fluorides, metal carbonates, metal silicates, polymers, etc.). Generally, the fill composition includes less than about 5 weight percent flux agents based on the total weight of the electrode, typically less than about 1 weight percent flux agents based on the total weight of the electrode, and more typically less than about 0.5 weight percent flux agents based on the total weight of the electrode.

The metal cored electrode is particularly designed for use in an electric arc welding process (e.g., AC welding, DC welding, DC pulse welding, STT welding, short circuit welding, etc.); however, other welding processes can be used. The metal cored electrode is also particularly designed for use in joining together metal plates such as, but not limited to, pipe sections (e.g., X-100, etc.); however, it can be appreciated that the metal cored electrode can be used to join together may other types of workpieces. The metal cored electrode is can be used in automatic or semi-automatic welding procedure. For instance, the metal cored electrode can be used in a robotic electric arc welding operation to join pipe sections together using a single pass or multi pass procedure. When using the metal cored electrode, the wire feed speed of the metal cored electrode is generally less than about 800 in./min., and typically less than about 600 in./min., and has a deposition rate of less than about 15 lbs./hr. and typically less than about 13 lbs./hr.; however, other wire feed speed rate and/or deposition rates can be used.

One non-limiting object of the present invention is the provision of a weld metal and metal cored wire used to form the weld metal that overcomes problems in the prior art.

It is another and/or alternative non-limiting object of the present invention to provide a weld metal and metal cored wire used to form the weld metal that can be used to form weld beads in narrow grooves.

It is still another and/or alternative non-limiting object of the present invention to provide a weld metal and metal cored wire used to form the weld metal having increased yield strength.

It is yet another and/or alternative non-limiting object of the present invention to provide a weld metal and metal cored wire used to form the weld metal having increased tensile strength.

It is still yet another and/or alternative non-limiting object of the present invention to provide a weld metal and metal cored wire used to form the weld metal having improved impact toughness.

These and other objects and advantages will become apparent from the discussion of the distinction between the invention and the prior art.

DETAILED DESCRIPTION OF THE INVENTION

Referring to the following description of the invention for purposes of describing preferred embodiments of the invention only, and not for the purpose of limiting the invention, the consumable metal cored electrode of the present invention is formulated to form a weld bead having improved yield strength and notch toughness. The electrode is particularly useful in welding X-100 pipe; however, the electrode can be used to form weld beads on many other types of workpieces. The electrode is particularly useful in forming high quality and high strength welding bead in narrow grooves. This type of welding can be performed by single pass per layer of welding using a robotic welder by an electric arc welding process; however, this is not required. The average yield strength of the formed weld bead is generally at least about 85 ksi, and typically at least about 95 ksi. The average tensile strength of the formed weld bead is generally at least about 90 ksi, and typically at least about 100 ksi. The average Charpy notch toughness of the formed weld bead is generally at least about 30 ft-lbs at −30° C. and at least about 38 ft-lbs at −20° C., and typically at least about 40 ft-lbs at −30° C. and at least about 44 ft-lbs at −20° C.

The fill material in the metal cored electrode primarily includes alloying agents. One non-limiting general formulation of the weld metal formed by the metal cored electrode, by weight percent:

Al 0-0.04%
B 0.0025-0.008%
C 0.01-0.12%
Cu 0-0.2%
Fe 93-98%
Mn 0.1-3%
Mo 0.15-0.8%
Ni 0-3%
Si 0.05-1.5%
Ti 0.015-0.1%

The chemical analysis of several non-limiting specific examples weld metals by weight percent which can be formed by the metal cored electrode of the present invention is set forth as follows:

|    | Ex. 1  | Ex. 2  | Ex. 3  | Ex. 4  | Ex. 5  | Ex. 6  | Ex. 7  |
|----|--------|--------|--------|--------|--------|--------|--------|
| Al | ≤0.05  | ≤0.05  | ≤0.05  | ≤0.05  | ≤0.05  | ≤0.05  | ≤0.05  |
| B  | 0.0048 | 0.0051 | 0.0052 | 0.005  | 0.0055 | 0.0043 | 0.0054 |
| C  | 0.029  | 0.067  | 0.061  | 0.091  | 0.052  | 0.088  | 0.077  |
| Cu | 0.062  | 0.046  | 0.052  | 0.062  | 0.062  | 0.064  | 0.049  |

-continued

| | | | | | | | |
|---|---|---|---|---|---|---|---|
| Fe | at least 95 | at least 95 | at least 95 | at least 95 | at least 95 | at least 95 | at least 95 |
| Mn | 2.02 | 1.99 | 1.46 | 2 | 1.53 | 1.34 | 1.44 |
| Mo | 0.4 | 0.43 | 0.4 | 0.43 | 0.42 | 0.4 | 0.43 |
| N | ≤0.008 | ≤0.008 | ≤0.008 | ≤0.008 | ≤0.008 | ≤0.008 | ≤0.008 |
| Ni | 1.92 | 1.06 | 2.04 | 0.07 | 0.08 | 0.06 | 1.1 |
| O | ≤0.15 | ≤0.15 | ≤0.15 | ≤0.15 | ≤0.15 | ≤0.15 | ≤0.15 |
| P | ≤0.02 | ≤0.02 | ≤0.02 | ≤0.02 | ≤0.02 | ≤0.02 | ≤0.02 |
| S | ≤0.012 | ≤0.012 | ≤0.012 | ≤0.012 | ≤0.012 | ≤0.012 | ≤0.012 |
| Si | 0.43 | 0.44 | 0.44 | 0.41 | 0.45 | 0.36 | 0.42 |
| Ti | 0.027 | 0.031 | 0.037 | 0.033 | 0.032 | 0.034 | 0.037 |

| | Ex. 8 | Ex. 9 | Ex. 10 | Ex. 11 | Ex. 12 | Ex. 13 | Ex. 14 |
|---|---|---|---|---|---|---|---|
| Al | ≤0.05 | ≤0.05 | ≤0.05 | ≤0.05 | ≤0.05 | ≤0.05 | ≤0.05 |
| B | 0.0049 | 0.0052 | 0.0059 | 0.006 | 0.005 | 0.0056 | 0.0048 |
| C | 0.034 | 0.094 | 0.042 | 0.027 | 0.039 | 0.033 | 0.03 |
| Cu | 0.077 | 0.054 | 0.042 | 0.055 | 0.061 | 0.061 | 0.052 |
| Fe | at least 95 | at least 95 | at least 95 | at least 95 | at least 95 | at least 95 | at least 95 |
| Mn | 1.9 | 1.36 | 2.02 | 1.56 | 1.99 | 1.56 | 2.02 |
| Mo | 0.42 | 0.38 | 0.39 | 0.42 | 0.39 | 0.38 | 0.37 |
| N | ≤0.008 | ≤0.008 | ≤0.008 | ≤0.008 | ≤0.008 | ≤0.008 | ≤0.008 |
| Ni | 0.99 | 0.08 | 0.05 | 2.12 | 0.08 | 1.87 | 1.73 |
| O | ≤0.15 | ≤0.15 | ≤0.15 | ≤0.15 | ≤0.15 | ≤0.15 | ≤0.15 |
| P | ≤0.02 | ≤0.02 | ≤0.02 | ≤0.02 | ≤0.02 | ≤0.02 | ≤0.02 |
| S | ≤0.012 | ≤0.012 | ≤0.012 | ≤0.012 | ≤0.012 | ≤0.012 | ≤0.012 |
| Si | 0.44 | 0.34 | 0.44 | 0.45 | 0.41 | 0.43 | 0.41 |
| Ti | 0.028 | 0.037 | 0.026 | 0.031 | 0.026 | 0.034 | 0.026 |

The average tensile strength (ksi), yield strength (ksi), Charpy impact toughness(ft-lbs @ at −20° C.), Charpy impact toughness(ft-lbs @ at −30° C.) and percent elongation of the fourteen non-limiting weld metals is set forth as follows:

| | Ex. 1 | Ex. 2 | Ex. 3 | Ex. 4 | Ex. 5 | Ex. 6 | Ex. 7 |
|---|---|---|---|---|---|---|---|
| TS | 125 | 133 | 136.5 | 130.5 | 110 | 129 | 128 |
| YS | 117.5 | 125 | 125 | 123 | 104.5 | 122.5 | 121 |
| CIT (−20° C.) | 46 | 44 | 31 | 50 | 61 | 67 | 36 |
| CIT (−30° C.) | 41 | 38 | 22 | 54 | 50 | 56 | 29 |
| EL | 19 | 20 | 18 | 20 | 21 | 14.5 | 20 |

| | Ex. 8 | Ex. 9 | Ex. 10 | Ex. 11 | Ex. 12 | Ex. 13 | Ex. 14 |
|---|---|---|---|---|---|---|---|
| TS | 115.5 | 120 | 109 | 114 | 108 | 114.5 | 114.5 |
| YS | 108.5 | 114 | 103 | 107.5 | 101.5 | 108.5 | 110 |
| CIT (−20° C.) | 44 | 86 | 77 | 53 | 51 | 53 | 52 |
| CIT (−30° C.) | 47 | 77 | 63 | 45 | 43 | 49 | 47 |
| EL | 23.5 | 20.5 | 25.5 | 22.5 | 23.5 | 22.5 | 21 |

The weld beads in the above examples were formed on X-100 pipe sections by an electric arc welding process. A one pass per layer welding operation using a robotic welder was used to form the weld bead. A travel speed of less than 50 in./min. and a deposition rate of less than about 14 lbs./hr. were used to form the weld bead. A shielding gas of argon and carbon dioxide was used during the welding process.

The yield strength (YS) of the weld metal was found to have a linear dependence on the amount of carbon, manganese and nickel in the weld metal. Amongst these three elements, the strongest linear dependence was on the carbon content in the weld metal. As the carbon content increased in the weld metal, the yield strength of the weld metal increased. Similarly, increased manganese and nickel content in the weld metal increased the yield strength. The tensile strength (TS) of the weld metal was found to have a linear dependence on the amount of carbon and nickel in the weld metal. Amongst these two elements, the strongest linear dependence was on the carbon content in the weld metal. As the carbon content increased in the weld metal, the tensile strength of the weld metal increased. Similarly, increased nickel content in the weld metal increased the tensile strength. The Charpy impact toughness (CIT) of the weld metal was found to be dependent on the carbon and nickel content. Lower carbon content and higher nickel content, or higher carbon content and lower nickel content resulted in higher values for the Charpy impact toughness. A high percent of carbon and nickel in the weld metal was found to result in lower values for the Charpy impact toughness. As such, when the nickel content of the weld metal is at least 1.1 weight percent, the carbon content is typically less than about 0.05, and more typically less than about 0.04. When the nickel content is less than about 1.1, the carbon content can exceed about 0.05 weight percent; however, this is not required. As illustrated in Examples 3 and 7 above, the carbon content exceeded 0.05 weight percent when the nickel content was above 1.1 weight percent; as such, the Charpy impact toughness values were lower for these two weld metals. The boron, molybdenum and titanium content in the weld metal is believed to the improve the strength and/or microstructure properties of the solid weld metal.

One non-limiting examples of a metal cored electrode that can form the weld metal as set forth above is metal cored electrode formed of a low carbon or mild steel sheath and includes a metal alloy fill composition in weight percent of the electrode as follows:
Al 0-0.08%
B 0.001-0.01%
Fe 0-98%
Mo 0-2.5%
Mn 0-3
Ni 0-3%
Si 0-1.5%
Ti 0.001-0.1%

The fill composition in the electrode typically constitutes about 15-25 weight percent of the electrode.

It will thus be seen that the objects set forth above, among those made apparent from the preceding description, are efficiently attained, and since certain changes may be made in the constructions set forth without departing from the spirit and scope of the invention, it is intended that all matter contained in the above description and shown in the accompanying drawings shall be interpreted as illustrative and not in a limiting sense. The invention has been described with reference to a preferred embodiment. Modifications and alterations will become apparent to those skilled in the art upon reading and understanding the detailed discussion of the invention provided herein. This invention is intended to include all such modifications and alterations insofar as they come within the scope of the present invention. It is also to be understood that the following claims are intended to cover all of the generic and specific features of the invention herein described and all statements of the scope of the invention, which, as a matter of language, might be said to fall therebetween.

We claim:

1. A cored metal electrode which forms a weld metal in narrow grooves having improved yield strength and tensile strength comprising of
   between about 0.001-0.02 weight percent boron,
   between about 0.05-2 weight percent molybdenum,
   between about 0.005-0.5 weight percent titanium and
   a majority of iron,
   a weight percent ratio in said weld metal of
      titanium to boron being at least about 2:1, and
      molybdenum to titanium being at least about 4:1,
   said weld metal having
      an average yield strength of at least about 70 ksi and
      an average tensile strength of at least about 90 ksi,
   said cored metal electrode compising:
      a sheath; and
      a fill composition inside said sheath, said fill composition containing less than 1 weight percent flux agents based on the total weight of said cored metal electrode.

2. The electrode as defined in claim 1, comprising by weight percent in said weld metal:
   Fe at least 75%.

3. The electrode as defined in claim 2, comprising by weight percent in said weld metal:
   B 0.002-0.015%
   Mo 0.1-1.5%
   Ti 0.01-0.18%
   Fe at least 80%.

4. The electrode as defined in claim 3, comprising by weight percent in said weld metal:
   B 0.0025-0.008%
   C 0.01-0.1%
   Mo 0.15-0.8%
   Mn 0.1-3%
   Ni 0-3%
   Si 0-1%
   Ti 0.015-0.1%
   Fe at least 85%.

5. The electrode as defined in claim 1, wherein
   a weight percent of Ti to B is about 3-15:1.

6. The electrode as defined in claim 5, wherein
   a weight percent of Ti to B is about 4-10:1.

7. The electrode as defined in claim 1, wherein
   a weight percent of Mo to Ti is about 7-24:1.

8. The electrode as defined in claim 7, wherein
   a weight percent of Mo to Ti is about 8-18:1.

9. The electrode as defined in claim 1, wherein
   said weld metal has an average Charpy impact toughness of at least about 38 ft-lbs at −20° C.

10. A method of forming a weld bead on a workpiece having improved yield strength and tensile strength by an electric arc welding process comprising:
    a) selecting a workpiece; and,
    b) at least partially melting a consumable electrode with an electric arc and depositing molten weld metal on the workpiece; and,
    c) allowing said molten weld metal to cool and solidify to form a weld bead on said workpiece, said weld metal including
       between about 0.001-0.02 weight percent boron,
       between about 0.05-2 weight percent molybdenum,
       between about 0.005-0.5 weight percent titanium and
       a weight percent ratio in said weld metal of
          titanium to boron being at least about 2:1, and
          molybdenum to titanium being at least about 4:1,
       said weld metal having an average yield strength of at least about 70 ksi and an average tensile strength of at least about 90 ksi,
       said consumable electrode being a cored metal electrode comprising:
          a sheath; and
          a fill composition inside said sheath, said fill composition containing less than 1 weight percent flux agents based on the total weight of said cored metal electrode.

11. The method as defined in claim 10, including
    the step of using a shielding gas to at least partially shield said molten weld metal from the atmosphere.

12. The method as defined in claim 10, including
    the step of feeding said consumable electrode to said workpiece at a rate of less than about 800 in./min. and at a deposition rate of less than about 15 lbs./hr.

13. The method as defined in claim 10, including
    the step of using a robotic welding to at least partially form said weld bead.

14. The method as defined in claim 10, wherein
    said workpiece includes a pipe section.

15. The method as defined in claim 10, wherein said weld bead comprises by weight percent:
    Fe at least 75%.

16. The method as defined in claim 11, wherein said weld bead comprises by weight percent:
    B 0.002-0.015%
    Mo 0.1-1.5%
    Ti 0.01-0.18%
    Fe at least 80%.

17. The method as defined in claim 15, wherein said weld bead comprises by weight percent:
    B 0.0025-0.008%
    C 0.01-0.1%
    Mo 0.15-0.8%
    Mn 0.1-3%

Ni 0-3%
Si 0-1%
Ti 0.015-0.1%
Fe at least 85%.
18. The method as defined in claim 10, wherein
said weld bead has an average Charpy impact toughness of at least about 38 ft-lbs at -20° C.
19. The method as defined in claim 10, wherein
said consumable electrode is a metal cored electrode.
20. The method as defined in claim 19, wherein said metal cored electrode comprises by weight percent electrode:
B at least 0.001%
Mo at least 0.05%
Ti at least 0.005%
Fe at least 70%.
21. The method as defined in claim 20, wherein said metal cored electrode comprises by weight percent electrode:
B 0.0015-0.025%
Mo 0.5-2.5%
Ti 0.005-0.6%
Fe at least 80%.
22. The method as defined in claim 21, wherein said metal cored electrode comprises by weight percent electrode:
B 0.002-0.02%
C 0.008-0.2%
Mo 0.1-1.7%
Mn 0.05-5%
Ni 0-5%
Si 0-3%
Ti 0.01-0.2%
Fe at least 85%.
23. The method as defined in claim 19, wherein
said metal cored electrode includes a metal sheath and a fill composition, said fill composition comprising over 12 weight percent of said electrode.
24. The method as defined in claim 23, wherein
said fill composition includes less than about 5 weight percent flux agents.
25. A metal cored electrode that can be used to form a weld bead on a workpiece having improved yield strength and tensile strength, said metal cored electrode comprising
a metal sheath and
a fill composition, said fill composition comprising over 12 weight percent of said electrode, said fill composition inside said sheath, said fill composition containing less than 1 weight percent flux agents based on the total weight of said metal cored electrode
said metal cored electrode including at least
between about 0.001-0.02 weight percent boron,
between about 0.05-2 weight percent molybdenum,
between about 0.005-0.5 weight percent titanium, and
a majority weight percent iron
a weight percent ratio in said weld bead of
titanium to boron being at least about 2:1, and
molybdenum to titanium being at least about 4:1.
26. The metal cored electrode as defined in claim 25, comprising by weight percent:
B 0.0015-0.025%
Mo 0.5-2.5%
Ti 0.005-0.6%
Fe at least 80%.
27. The metal cored electrode as defined in claim 26, comprising by weight percent:
B 0.002-0.02%
C 0.008-0.2%
Mo 0.1-1.7%
Mn 0.05-5%
Ni 0-5%
Si 0-3%
Ti 0.01-0.2%
Fe at least 85%.
28. The metal cored electrode as defined in claim 27, comprising by weight percent:
Al 0-0.5%
B 0.0025-0.01%
C 0.01-0.15%
Cr 0-0.5%
Cu 0-0.5%
Mo 0.2-1.5%
Mn 0.1-3%
Ni 0-3%
Si 0-1.5%
Ti 0.015-0.1%
Fe at least 88%.
29. The metal cored electrode as defined in claim 25, wherein said fill composition comprises by weight percent of the electrode
at least about 0.001 weight percent boron,
at least about 0.01 weight percent molybdenum, and
at least about 0.001 weight percent titanium.
30. The metal cored electrode as defined in claim 29, wherein said fill composition comprises by weight percent of the electrode:
Al 0-0.5%
B 0.001-0.025%
Fe 0-98%
Mo 0-2.5%
Mn 0-5
Ni 0-5%
Si 0-3%
Ti 0.001-0.6%.

* * * * *